(12) United States Patent
Yen et al.

(10) Patent No.: US 10,069,196 B1
(45) Date of Patent: Sep. 4, 2018

(54) MOBILE DEVICE

(71) Applicant: Acer Incorporated, New Taipei (TW)

(72) Inventors: Ming-Ching Yen, New Taipei (TW);
Kun-Sheng Chang, New Taipei (TW);
Shih-Ting Huang, New Taipei (TW);
Cheng-Yu Hsieh, New Taipei (TW);
Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/792,978

(22) Filed: Oct. 25, 2017

(30) Foreign Application Priority Data

Aug. 21, 2017 (TW) .............................. 106128246 A

(51) Int. Cl.
*H04M 1/02* (2006.01)
*H01Q 1/24* (2006.01)
*H01Q 21/00* (2006.01)

(52) U.S. Cl.
CPC ......... *H01Q 1/244* (2013.01); *H01Q 21/0031* (2013.01); *H04M 1/026* (2013.01)

(58) Field of Classification Search
CPC ........ H04B 1/3838; H01Q 5/50; H01Q 1/244; H01Q 1/245; H01Q 1/362; H01Q 2/0031; H04M 1/026
See application file for complete search history.

(56) References Cited

U.S. PATENT DOCUMENTS

| 2013/0252677 | A1* | 9/2013 | Wong | H04B 1/3838 |
| | | | | 455/575.5 |
| 2016/0013553 | A1* | 1/2016 | Contreras | H01Q 1/244 |
| | | | | 343/702 |
| 2017/0141469 | A1* | 5/2017 | Huang | H01Q 1/243 |
| 2017/0264002 | A1* | 9/2017 | Yen | H01Q 1/243 |

* cited by examiner

*Primary Examiner* — Thanh Le
(74) *Attorney, Agent, or Firm* — McClure, Qualey & Rodack, LLP

(57) ABSTRACT

A mobile device includes a first nonconductive supporting element, a second nonconductive supporting element, and an antenna structure. The first nonconductive supporting element and the second nonconductive supporting element are adjacent to each other. The first nonconductive supporting element and the second nonconductive supporting element have different heights. The antenna structure is formed on the first nonconductive supporting element and the second nonconductive supporting element. The antenna element includes a feeding connection element, a first radiation element, and a second radiation element. The feeding connection element is coupled to a feeding point. The first radiation element and the second radiation element are coupled to the feeding connection element. The feeding connection element is disposed between the first radiation element and the second radiation element.

17 Claims, 8 Drawing Sheets

MOBILE DEVICE

CROSS REFERENCE TO RELATED APPLICATIONS

This Application claims priority of Taiwan Patent Application No. 106128246 filed on Aug. 21, 2017, the entirety of which is incorporated by reference herein.

BACKGROUND OF THE INVENTION

Field of the Invention

The disclosure generally relates to a mobile device, and more particularly, to a mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

In order to improve their appearance, designers often incorporate metal elements into mobile devices. However, the newly added metal elements tend to negatively affect the antennas used for wireless communication in mobile devices, thereby degrading the overall communication quality of the mobile devices. As a result, there is a need to propose a mobile device with a novel antenna structure, so as to overcome the problems of the prior art.

BRIEF SUMMARY OF THE INVENTION

In a preferred embodiment, the invention is directed to a mobile device including a first nonconductive supporting element, a second nonconductive supporting element, and an antenna structure. The first nonconductive supporting element and the second nonconductive supporting element are adjacent to each other. The first nonconductive supporting element and the second nonconductive supporting element have different heights. The antenna structure is formed on the first nonconductive supporting element and the second nonconductive supporting element. The antenna element includes a feeding connection element, a first radiation element, and a second radiation element. The feeding connection element is coupled to a feeding point. The first radiation element and the second radiation element are coupled to the feeding connection element. The feeding connection element is disposed between the first radiation element and the second radiation element.

In some embodiments, the first nonconductive supporting element is an appearance edge portion of the mobile device.

In some embodiments, the second nonconductive supporting element is an antenna placement platform or a display placement platform.

In some embodiments, the height of the first nonconductive supporting element is greater than the height of the second nonconductive supporting element.

In some embodiments, the antenna structure further includes a shorting element. The second radiation element is coupled through the shorting element to the feeding connection element, such that a closed loop is formed by the feeding connection element, the second radiation element, and the shorting element.

In some embodiments, the feeding connection element, the second radiation element, and the shorting element are distributed over only the second nonconductive supporting element.

In some embodiments, the first radiation element is distributed over the first nonconductive supporting element and the second nonconductive supporting element.

In some embodiments, the antenna structure covers a low-frequency band from 2400 MHz to 2500 MHz, a first high-frequency band from 5150 MHz to 5350 MHz, and a second high-frequency band from 5350 MHz to 5850 MHz.

In some embodiments, the total length of the feeding connection element and the first radiation element is substantially equal to 0.25 wavelength of the low-frequency band.

In some embodiments, the total length of the feeding connection element and the second radiation element is substantially equal to 0.25 wavelength of the second high-frequency band.

In some embodiments, the total length of the feeding connection element, the second radiation element, and the shorting element is substantially equal to one wavelength of the second high-frequency band.

In some embodiments, the mobile device further includes a display device and a display frame. The display frame is disposed adjacent to the display device. The display frame extends into a height-difference notch defined by the first nonconductive supporting element and the second nonconductive supporting element.

In some embodiments, the mobile device further includes a coaxial cable. The coaxial cable is disposed between the display device and the second nonconductive supporting element.

In some embodiments, the coaxial cable includes a central conductive line and a conductive housing. The central conductive line is coupled to the feeding point.

In some embodiments, the mobile device further includes a metal back cover and a metal foil. The metal back cover is disposed adjacent to the first nonconductive supporting element, the second nonconductive supporting element, the antenna structure, and the display device. The conductive housing of the coaxial cable is coupled through the metal foil to the metal back cover.

In some embodiments, a separable antenna element is formed by the first nonconductive supporting element, the second nonconductive supporting element, and the antenna structure.

In some embodiments, a concave region is defined by the display device, the display frame, and the metal back cover. The separable antenna element is hidden in the concave region, or is extracted from the concave region.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
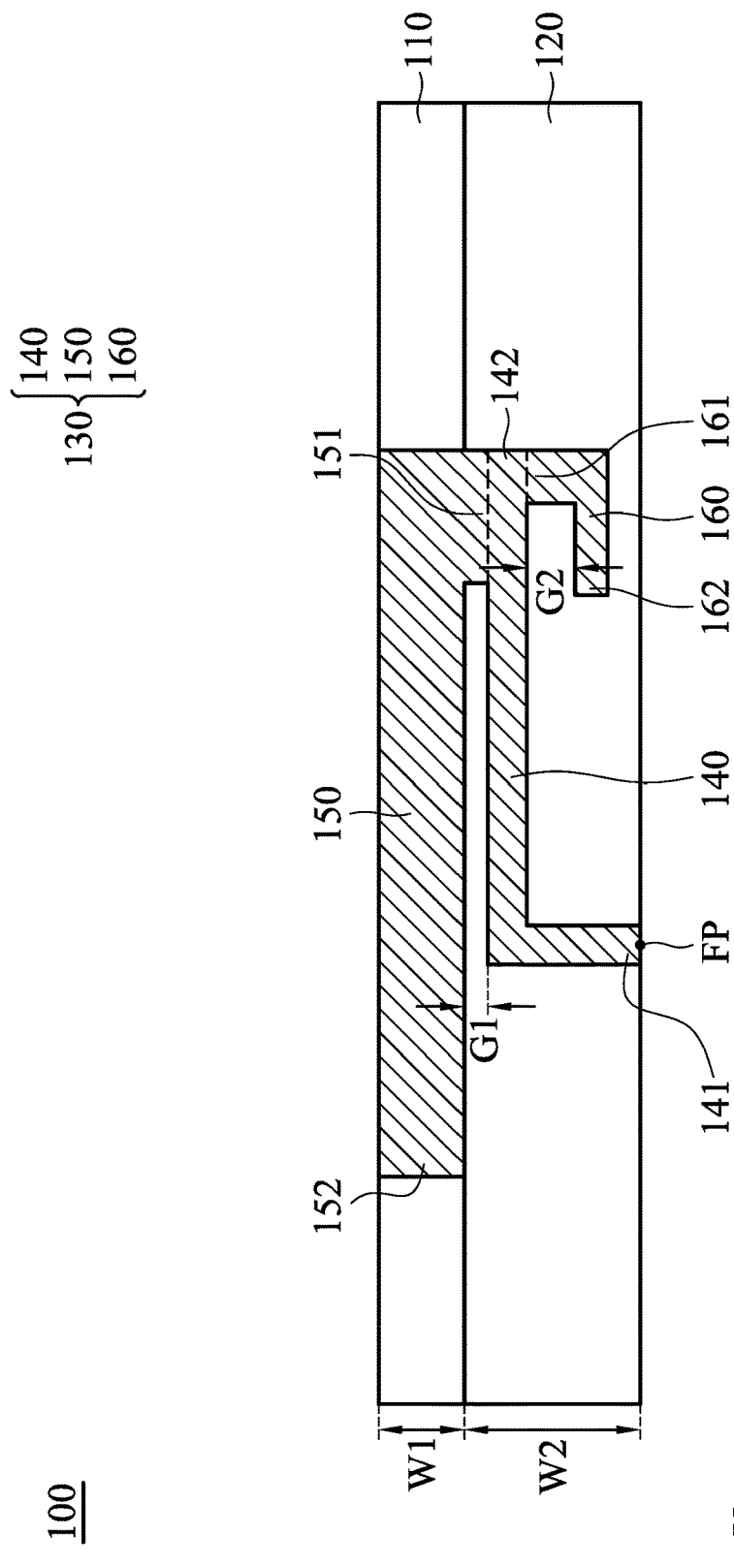
FIG. 1A is a top view of a mobile device according to an embodiment of the invention.
Figure 1B:
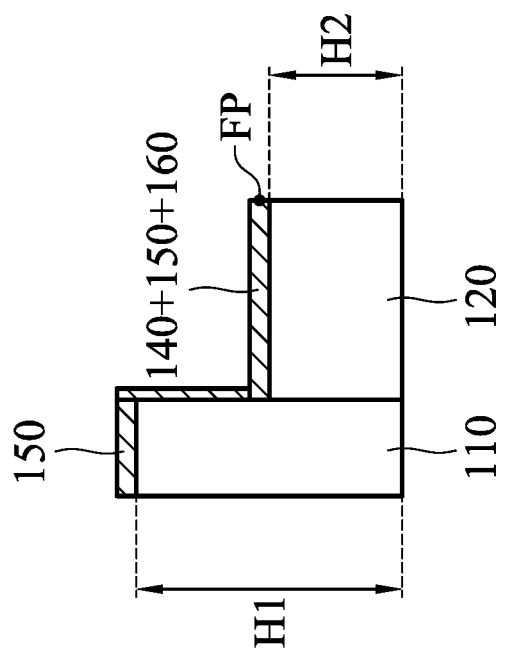
FIG. 1B is a side view of a mobile device according to an embodiment of the invention.
Figure 1B:
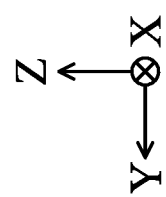

FIG. 1A is a top view of a mobile device 100 according to an embodiment of the invention. FIG. 1B is a side view of the mobile device 100 according to an embodiment of the invention. Please refer to FIG. 1A and FIG. 1B. The mobile device 100 may be a smartphone, a tablet computer, or a notebook computer. As shown in FIG. 1A and FIG. 1B, the mobile device 100 at least includes a first nonconductive supporting element 110, a second nonconductive supporting element 120, and an antenna structure 130. It should be understood that the mobile device 100 may further include other components, such as a display device, a speaker, a touch control module, a power supply module, and a housing, although they are not displayed in FIG. 1A and FIG. 1B.

The first nonconductive supporting element 110 and the second nonconductive supporting element 120 are made of plastic materials. For example, the first nonconductive supporting element 110 may be an appearance edge portion. The so-called appearance edge portion means an edge portion on the mobile device 100, and such an edge portion can be directly observed by user's eyes. The second nonconductive supporting element 120 may be an antenna placement platform or a display placement platform, which is configured to carry an antenna structure or a display device.

The first nonconductive supporting element 110 and the second nonconductive supporting element 120 are adjacent to each other. The first nonconductive supporting element 110 and the second nonconductive supporting element 120 have different heights on the Z-axis. For example, the height H1 of the first nonconductive supporting element 110 may be greater than the height H2 of the second nonconductive supporting element 120. The aforementioned height H1 may be 2 or more times the aforementioned height H2. It should be noted that the term "adjacent" or "close" over the disclosure means that the distance (spacing) between two corresponding elements is smaller than a predetermined distance (e.g., 1 mm or the shorter), or means that the two corresponding elements directly touch each other (i.e., the aforementioned distance/spacing therebetween is reduced to 0). Furthermore, the first nonconductive supporting element 110 and the second nonconductive supporting element 120 have different widths on the Y-axis. For example, the width W1 of the first nonconductive supporting element 110 may be smaller than the width W2 of the second nonconductive supporting element 120. It should be understood that the shapes of the first nonconductive supporting element 110 and the second nonconductive supporting element 120 are not limited in the invention, and they are adjustable according to different requirements.

The antenna structure 130 may be made of metal materials. Specifically, the antenna structure 130 includes a feeding connection element 140, a first radiation element 150, and a second radiation element 160. The feeding connection element 140 is substantially disposed between the first radiation element 150 and the second radiation element 160. The antenna structure 130 is a three-dimensional structure, and is formed on the first nonconductive supporting element 110 and the second nonconductive supporting element 120 which have a height difference therebetween. For example, the first radiation element 150 may be distributed over both the first nonconductive supporting element 110 and the second nonconductive supporting element 120. The feeding connection element 140 and the second radiation element 160 may be distributed over only the second nonconductive supporting element 120.

The feeding connection element 140 may substantially have an L-shape. The feeding connection element 140 has a first end 141 and a second end 142. The first end 141 of the feeding connection element 140 is coupled to a feeding point FP. The feeding point FP may be further coupled to a signal source (not shown). The first radiation element 150 may substantially have a straight-line shape or an L-shape. The first radiation element 150 has a first end 151 and a second end 152. The first end 151 of the first radiation element 150 is coupled to the second end 142 of the feeding connection element 140. The second end 152 of the first radiation element 150 is open. A first gap G1 is formed between the first radiation element 150 and the feeding connection element 140. The first gap G1 may substantially have a thin and long straight-line shape. The second radiation element 160 may substantially have an L-shape. The second radiation element 160 has a first end 161 and a second end 162. The first end 161 of the second radiation element 160 is coupled to the second end 142 of the feeding connection element 140. The second end 162 of the second radiation element 160 is open. A second gap G2 is formed between the second radiation element 160 and the feeding connection element 140. The second gap G2 may substantially have a rectangular shape. The length of the second radiation element 160 is smaller than the length of the first radiation element 150. For example, the length of the first radiation element 150 may be 3 or more times the length of the second radiation element 160. The width of the first radiation element 150 is greater than the width of the feeding connection element 140, and is also greater than the width of the second radiation element 160. The second end 152 of the first radiation element 150 and the second end 162 of the second radiation element 160 may extend toward the same direction, such as the direction of the −X axis.

Figure 2:
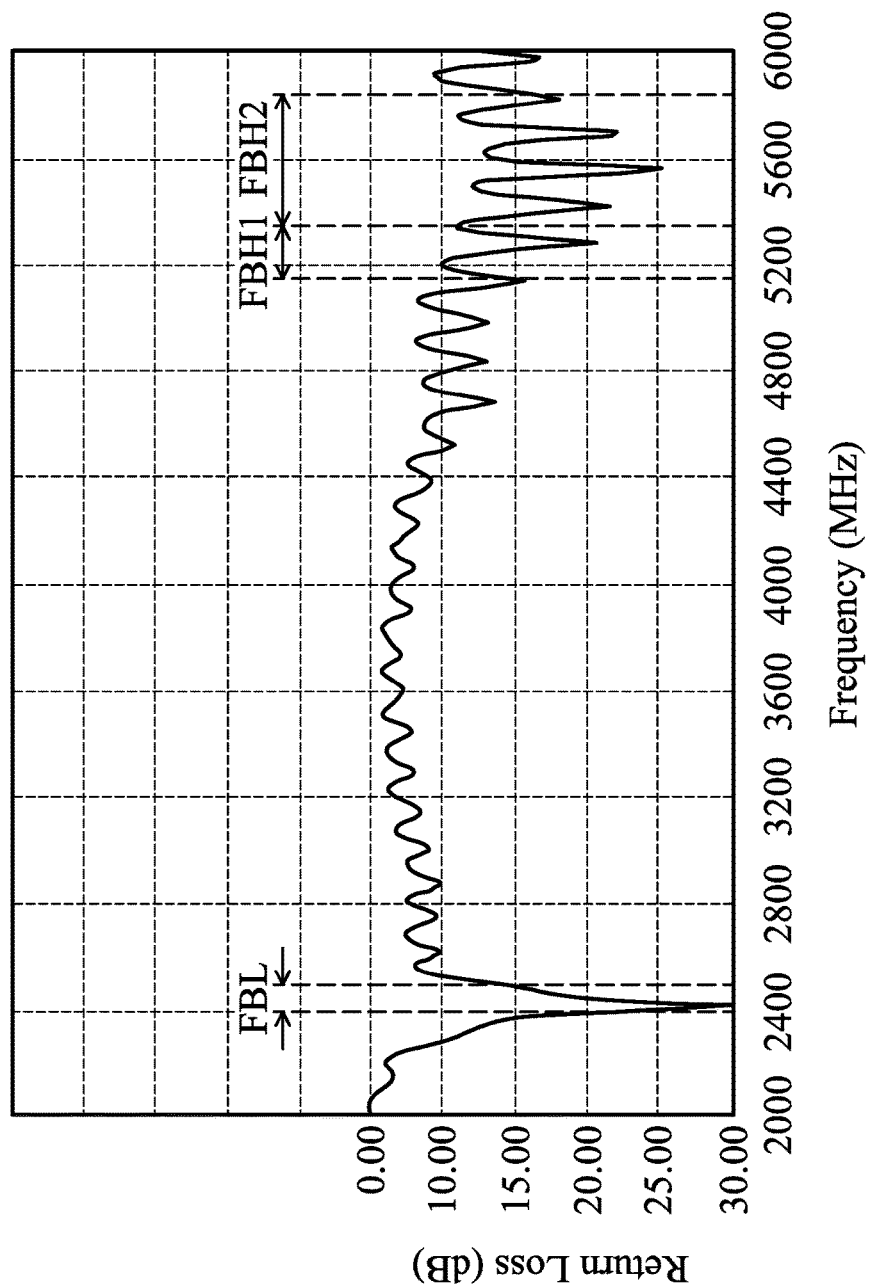
FIG. 2 is a diagram of return loss of an antenna structure of a mobile device according to an embodiment of the invention.

FIG. 2 is a diagram of return loss of the antenna structure 130 of the mobile device 100 according to an embodiment of the invention. The horizontal axis represents the operation frequency (MHz), and the vertical axis represents the return loss (dB). According to the measurement of FIG. 2, the antenna structure 130 can cover a low-frequency band FBL, a first high-frequency band FBH1, and a second high-frequency band FBH2. The low-frequency band FBL may be from 2400 MHz to 2500 MHz. The first high-frequency band FBH1 may be from 5150 MHz to 5350 MHz. The second high-frequency band FBH2 may be from 5350 MHz to 5850 MHz. Therefore, the antenna structure 130 can at least support the dual-band operation of WLAN (Wireless Local Area Networks) 2.4 GHz/5 GHz.

Figure 3:
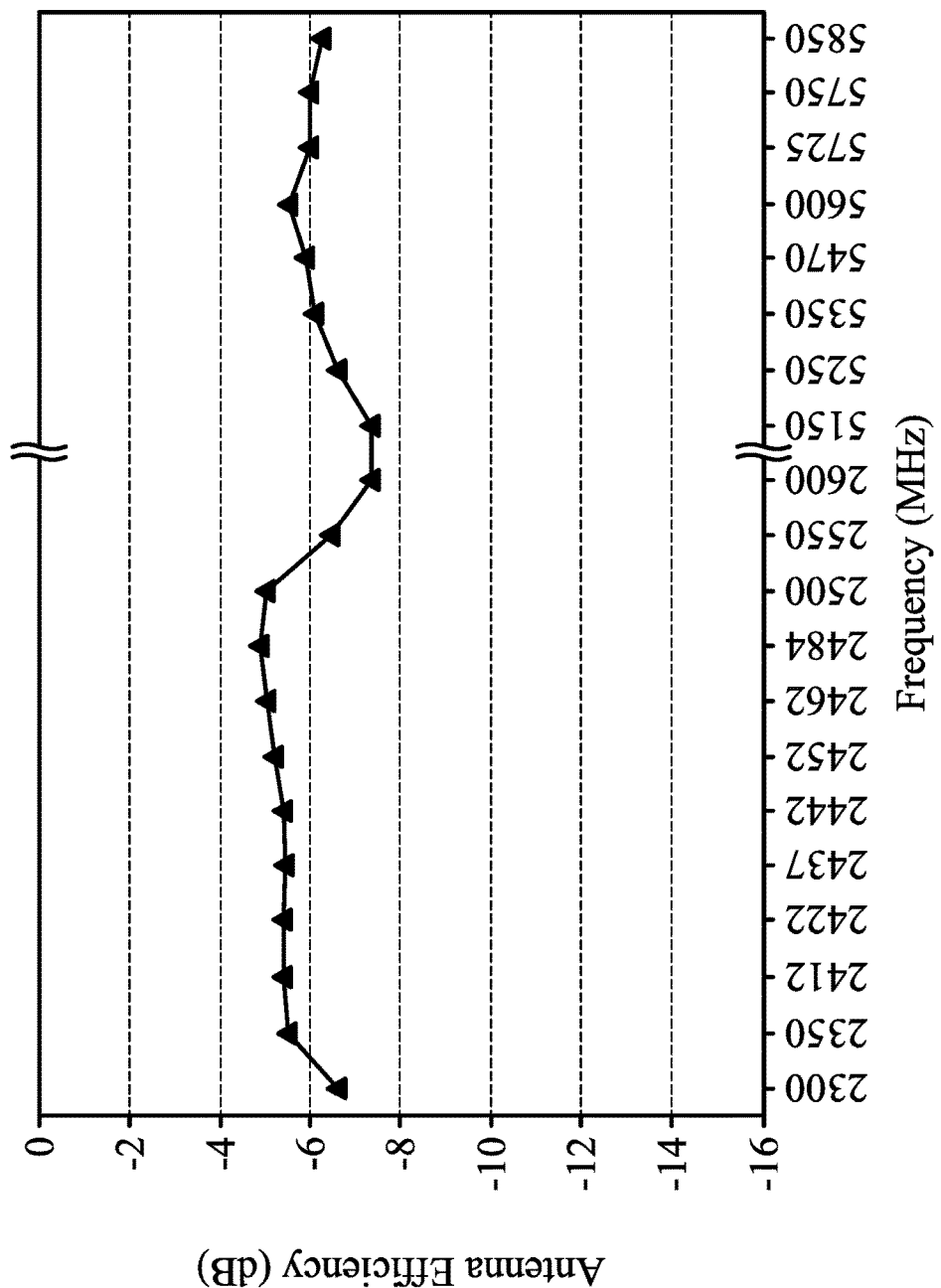
FIG. 3 is a diagram of antenna efficiency of an antenna structure of a mobile device according to an embodiment of the invention.

FIG. 3 is a diagram of antenna efficiency of the antenna structure 130 of the mobile device 100 according to an embodiment of the invention. The horizontal axis represents the operation frequency (MHz), and the vertical axis represents the antenna efficiency (dB). According to the measurement of FIG. 3, the antenna efficiency of the antenna structure 130 is about −5 dB in the low-frequency band FBL, and the antenna efficiency of the antenna structure 130 is about −6 dB in the first high-frequency band FBH1 and the second high-frequency band FBH2. This meets the practical requirements of application in general mobile communication devices.

The antenna operation theory and the element sizes of the mobile device 100 are as follows. The feeding connection element 140 and the first radiation element 150 are excited to generate a fundamental resonant mode, thereby forming the aforementioned low-frequency band FBL. The feeding connection element 140 and the first radiation element 150 are further excited to generate a higher-order resonant mode, thereby forming the aforementioned first high-frequency band FBH1 (double frequency). The feeding connection element 140 and the second radiation element 160 are excited to generate a resonant mode, thereby forming the aforementioned second high-frequency band FBH2. The total length of the feeding connection element 140 and the first radiation element 150 (i.e., the total length from the first end 141 through the second end 142 and the first end 151 to the second end 152) may be substantially equal to 0.25 wavelength ($\lambda/4$) of the low-frequency band FBL. The total length of the feeding connection element 140 and the second radiation element 160 (i.e., the total length from the first end 141 through the second end 142 and the first end 161 to the second end 162) may be substantially equal to 0.25 wavelength ($\lambda/4$) of the second high-frequency band FBH2. The height H1 of the first nonconductive supporting element 110 may be from 3.6 mm to 4 mm, such as 4 mm. The height H2 of the second nonconductive supporting element 120 may be from 1.6 mm to 1.8 mm, such as 1.8 mm. The width W1 of the first nonconductive supporting element 110 may be from 1.5 mm to 1.8 mm, such as 1.5 mm. The width W2 of the second nonconductive supporting element 120 may be from 4.7 mm to 5 mm, such as 5 mm. The width of the first gap G1 may be smaller than the width of the second gap G2. For example, the width of the second gap G2 may be 2 or more times of the width of the first gap G1. The above ranges of element sizes are calculated and obtained according to many experiment results, and they help to optimize the operation frequency band and the impedance matching of the antenna structure 130.

In the mobile device 100 of the invention, the antenna structure 130 may be used as an invisible antenna. For example, the antenna structure 130 can be integrated with the appearance edge portion of the mobile device 100 (e.g., the first nonconductive supporting element 110, which is also called "flesh thickness"), and can achieve an invisible design by using the height difference between the first nonconductive supporting element 110 and the second nonconductive supporting element 120. In addition, a spray and a coat process may be applied to the appearance edge portion and the antenna structure 130 of the mobile device 100, so as to reduce the visual difference between the non-metal and metal portions, and improve the appearance consistency of the mobile device 100.

Figure 4:
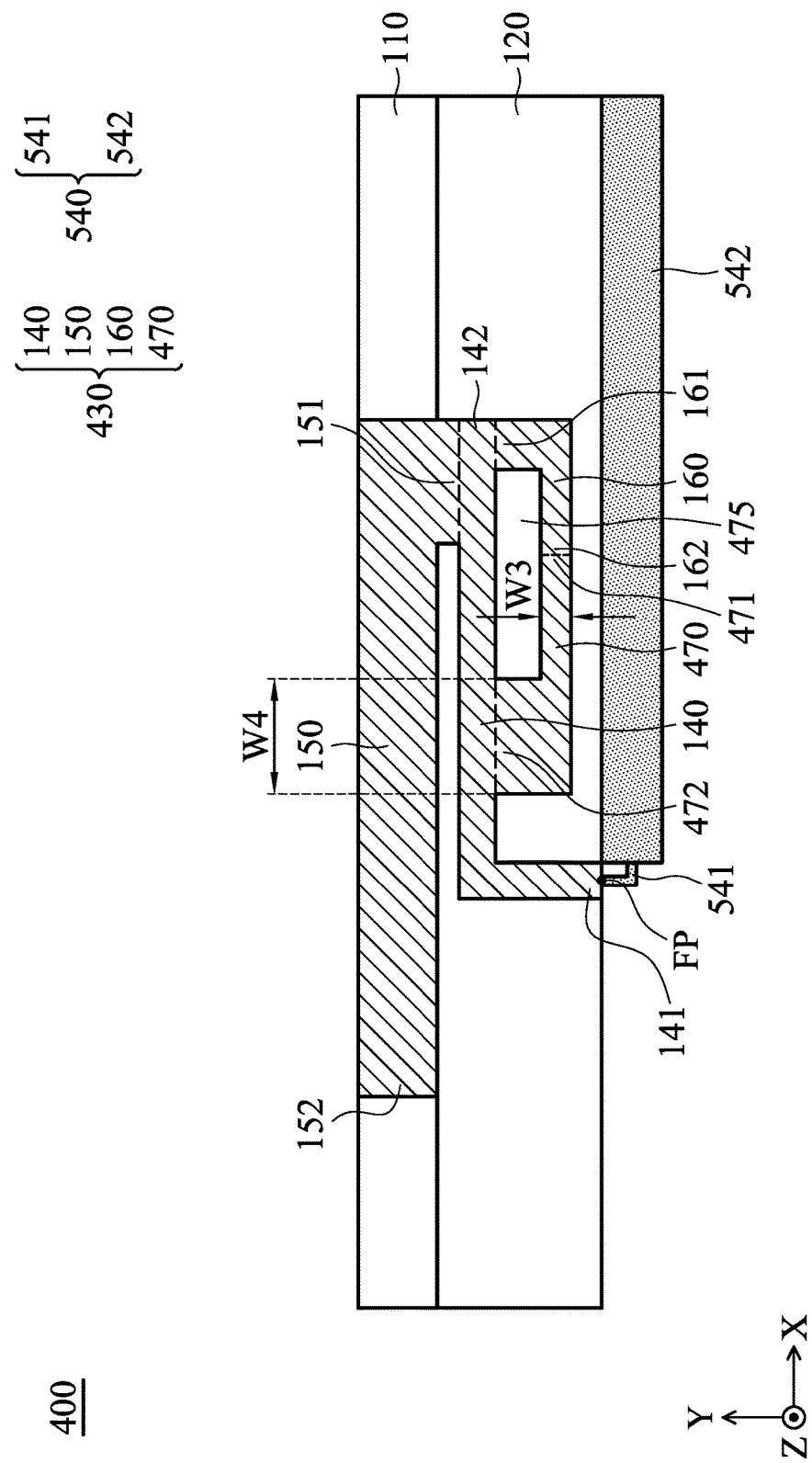
FIG. 4 is a top view of a mobile device according to an embodiment of the invention.

FIG. 4 is a top view of a mobile device 400 according to an embodiment of the invention. FIG. 4 is similar to FIG. 1A. In the embodiment of FIG. 4, an antenna structure 430 of the mobile device 400 further includes a shorting element 470. The shorting element 470 is made of metal materials, and it is distributed over only the second nonconductive supporting element 120. The shorting element 470 may substantially have an L-shape. The second radiation element 160 is coupled through the shorting element 470 to the feeding connection element 140, such that a closed loop is formed by the feeding connection element 140, the second radiation element 160, and the shorting element 470. The closed loop surrounds a rectangular non-metal region 475. Specifically, the shorting element 470 has a first end 471 and a second end 472. The first end 471 of the shorting element 470 is coupled to the second end 162 of the second radiation element 160. The second end 472 of the shorting element 470 is coupled to a central portion of the feeding connection element 140 (the aforementioned central portion is positioned between the first end 141 and the second end 142 of the feeding connection element 140). The width W3 of the first end 471 of the shorting element 470 is smaller than the width W4 of the second end 472 of the shorting element 470. For example, the aforementioned width W4 may be 3 or more times the aforementioned width W3, so as to fine-tune the high-frequency impedance matching. According to the practical measurement, the antenna structure 430 can also cover the low-frequency band FBL from 2400 MHz to 2500 MHz, the first high-frequency band FBH1 from 5150 MHz to 5350 MHz, and the second high-frequency band FBH2 from 5350 MHz to 5850 MHz. In the embodiment of FIG. 4, the feeding connection element 140, the second radiation element 160, and the shorting element 470 are excited to generate a resonant mode, thereby forming the aforementioned second high-frequency band FBH2. The total length of the feeding connection element 140, the second radiation element 160, and the shorting element 470 (i.e., the total length from the first end 141 through the second end 142, the first end 161, the second end 162, and the first end 471 to the second end 472) may be substantially equal to one wavelength ($1\lambda$) of the second high-frequency band FBH2. Other features of the mobile device 400 of FIG. 4 are similar to those of the mobile device 100 of FIG. 1A and FIG. 1B. Therefore, the two embodiments can achieve similar levels of performance.

Figure 5A:
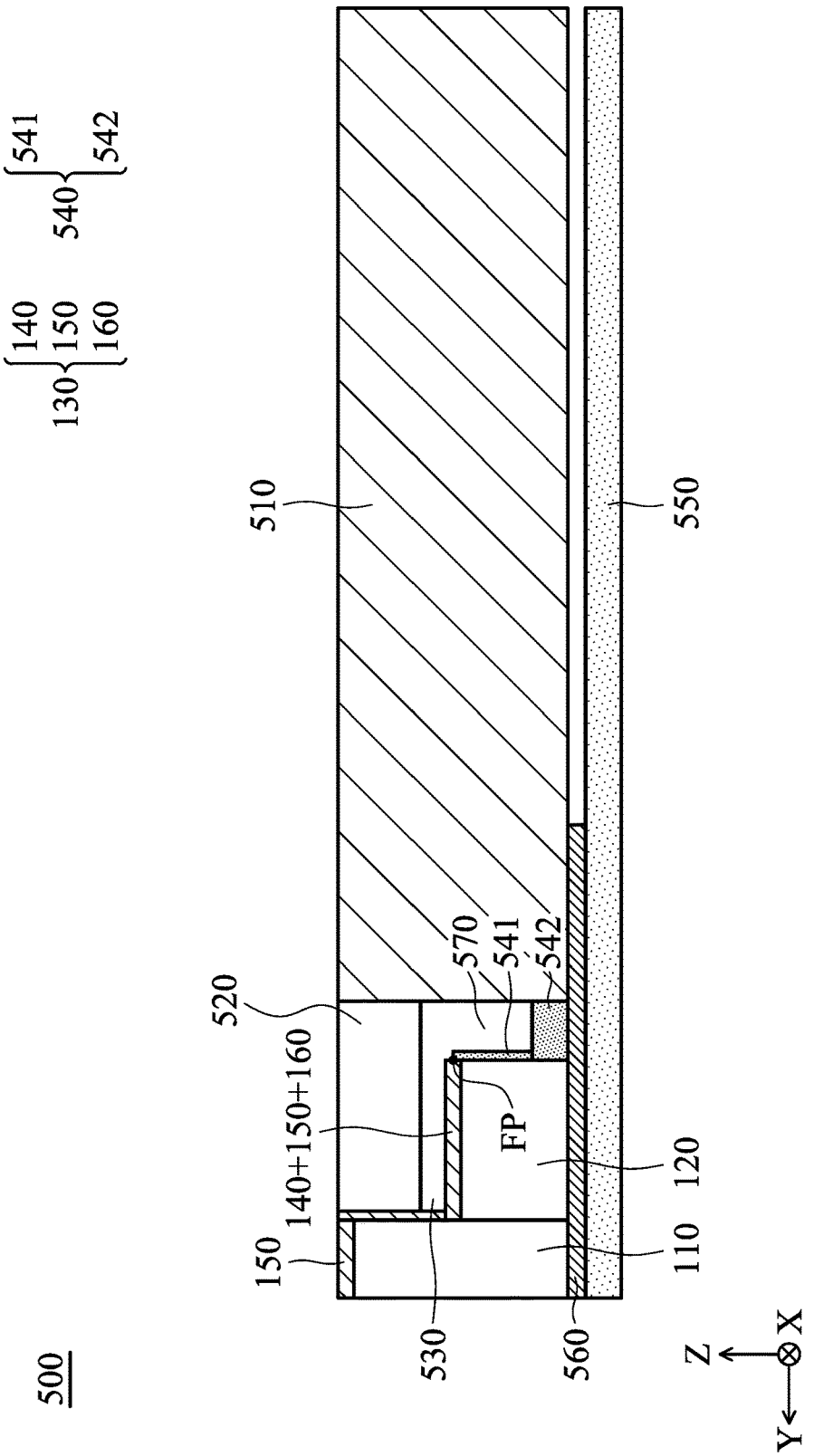
FIG. 5A is a side view of a mobile device according to an embodiment of the invention.
Figure 5B:
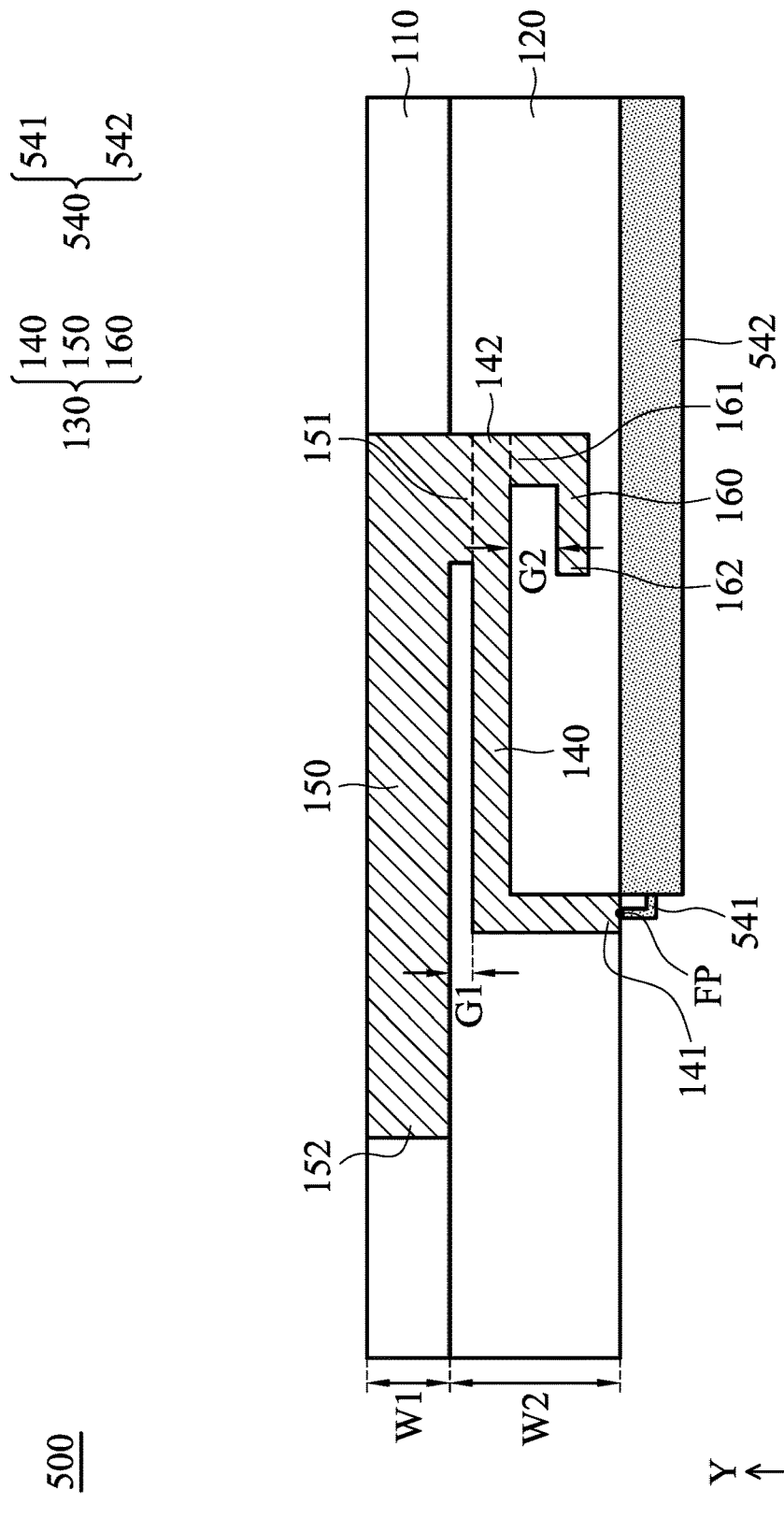
FIG. 5B is a top view of a mobile device according to an embodiment of the invention.

FIG. 5A is a side view of a mobile device 500 according to an embodiment of the invention. FIG. 5A is similar to FIG. 1B. In the embodiment of FIG. 5A, the mobile device 500 further includes a display device 510, a display frame 520, a coaxial cable 540, a metal back cover 550, and a metal foil 560. FIG. 5B is a top view of the mobile device 500 according to an embodiment of the invention, in which only the first nonconductive supporting element 110, the second nonconductive supporting element 120, the antenna structure 130, and the coaxial cable 540 are displayed, and the other components are omitted, so as to avoid visual obstruction. Please refer to FIG. 5A and FIG. 5B together.

In the embodiment of FIG. 5A and FIG. 5B, the mobile device 500 is a notebook computer. The metal back cover 550 is equivalent to the so-called "A component" of the notebook computer, and the display frame 520 is equivalent to the so-called "B component" of the notebook computer. The display frame 520 may be made of nonconductive materials, such as plastic materials. The display frame 520 is adjacent to the display device 510, and is configured to surround four edges of the display device 510. Specifically, the display frame 520 extends into a height-difference notch 530 defined by the first nonconductive supporting element 110 and the second nonconductive supporting element 120 (i.e., because the height H1 of the first nonconductive supporting element 110 is greater than the height H2 of the second nonconductive supporting element 120, the aforementioned height-difference notch 530 is generated between the first nonconductive supporting element 110 and the second nonconductive supporting element 120). Since the display frame 520 is nonconductive, it can be directly attached onto the first nonconductive supporting element 110 and the antenna structure 130 so as to enhance the stability of the whole structure, without negatively affecting the radiation pattern of the antenna structure 130. On the other hand, the display device 510 includes metal components, and therefore it is preferred that the display device 510 does not directly touch the antenna structure 130.

A signal source (not shown) may be coupled through the coaxial cable 540 to the feeding point FP, so as to excite the antenna structure 130. Specifically, the coaxial cable 540 includes a central conductive line 541 and a conductive housing 542. The central conductive line 541 of the coaxial cable 540 is coupled to the feeding point FP. The conductive housing 542 of the coaxial cable 540 is coupled through the metal foil 560 to the metal back cover 550. It should be noted that the coaxial cable 540 is disposed between the display device 510 and the second nonconductive supporting element 120, and is disposed adjacent to the metal back cover 550. Such a design can make the coaxial cable 540 hidden in a predetermined inner gap of the mobile device 500, and prevent the coaxial cable 540 from interfering with the antenna structure 130 and other components of the mobile device 500. The metal foil 560 may be a ground copper foil, which is attached to the conductive housing 542 of the coaxial cable 540 and extends onto the metal back cover 550. The metal back cover 550 is disposed adjacent to the first nonconductive supporting element 110, the second nonconductive supporting element 120, the antenna structure 130, and the display device 510. Accordingly, the metal back cover 550 is considered as a ground plane of the antenna structure 130. With such a design, the metal back cover 550 does not interfere with the radiation pattern of the antenna structure 130, and it can further enhance the radiation efficiency of the antenna structure 130.

Figure 5C:
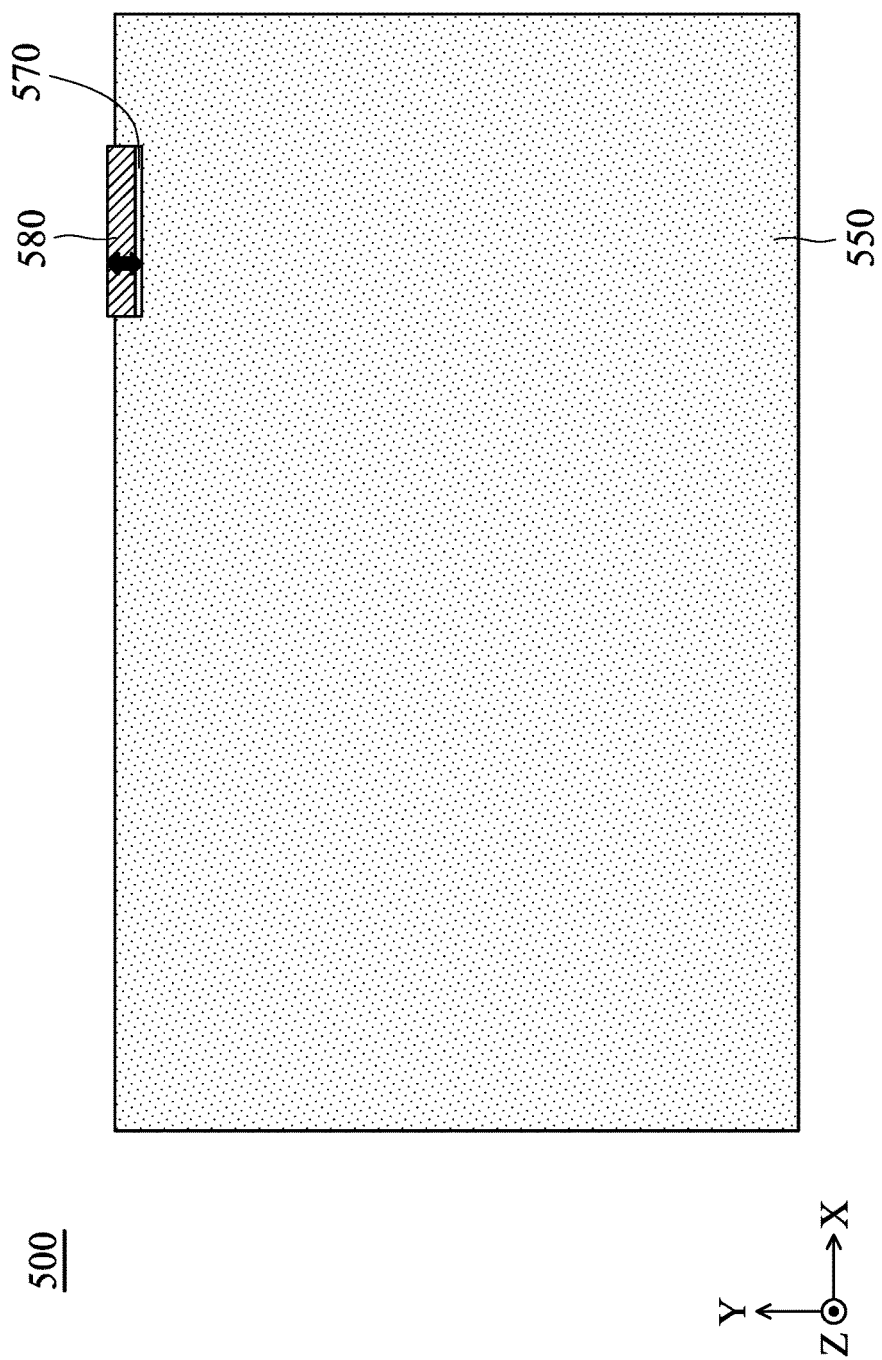
FIG. 5C is a side view of a mobile device according to an embodiment of the invention.

FIG. 5C is a side view of the mobile device 500 according to an embodiment of the invention. Please refer to FIG. 5A, FIG. 5B, and FIG. 5C together. In some embodiments, a concave region 570 of the mobile device 500 is defined by the display device 510, the display frame 520, and the metal back cover 550. A separable antenna element 580 is formed by the first nonconductive supporting element 110, the second nonconductive supporting element 120, and the antenna structure 130. In some embodiments, the separable antenna element 580 is attached to the display frame 520 (B component), and is configured as an extension portion of the display frame 520. In alternative embodiments, the separable antenna element 580 is attached to the metal back cover 550 (A component), and is configured as an extension portion of the metal back cover 550. Specifically, the separable antenna element 580 has a sliding mechanism. The separable antenna element 580 can be selectively hidden in the concave region 570 of the mobile device 500, or can be selectively extracted from the concave region 570 of the mobile device 500 by about 1 mm to 2 mm. For example, if the separable antenna element 580 is hidden in the concave region 570, it will improve the overall appearance of the mobile device 500. Conversely, if the separable antenna element 580 is extracted from the concave region 570 by about 1 mm to 2 mm, it will enhance the radiation efficiency of the antenna structure 130. The aforementioned antenna structure 130 may be replaced with the antenna structure 430 of FIG. 4, without affecting the performance of the invention. In alternative embodiments, the mobile device 500 includes a plurality of concave regions 570, so as to accommodate a plurality of separable antenna elements 580 and form an MIMO (Multi-Input and Multi-Output) antenna system. Other features of the mobile device 500 of FIG. 5A, FIG. 5B, and FIG. 5C are similar to those of the mobile device 100 of FIG. 1A and FIG. 1B. Therefore, the two embodiments can achieve similar levels of performance.

The invention proposes a novel mobile device including an invisible antenna structure. Such an antenna structure can be integrated with a metal back cover (A component) or a display frame (B component), and therefore the space at the appearance edge portion and its neighborhood of the mobile device can be effectively used. Generally, the invention has at least the advantages of small size, wide band, and beautiful device appearance, and it is suitable for application in a variety of narrow-border mobile communication devices.

Note that the above element sizes, element shapes, and frequency ranges are not limitations of the invention. An antenna designer can fine-tune these settings or values according to different requirements. It should be understood that the mobile device and the antenna structure of the invention are not limited to the configurations of FIGS. 1-5. The invention may include any one or more features of any one or more embodiments of FIGS. 1-5. In other words, not all of the features displayed in the figures should be implemented in the mobile device and the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:
1. A mobile device, comprising:
a first nonconductive supporting element;

a second nonconductive supporting element, wherein the first nonconductive supporting element and the second nonconductive supporting element are adjacent to each other and have different heights; and an antenna structure, formed on the first nonconductive supporting element and the second nonconductive supporting element, wherein the antenna structure comprises:

a feeding connection element, coupled to a feeding point;

a first radiation element, coupled to the feeding connection element; and a second radiation element, coupled to the feeding connection element, wherein the feeding connection element is disposed between the first radiation element and the second radiation element.

2. The mobile device as claimed in claim 1, wherein the first nonconductive supporting element is an appearance edge portion of the mobile device.

3. The mobile device as claimed in claim 1 wherein the second nonconductive supporting element is an antenna placement platform or a display placement platform.

4. The mobile device as claimed in claim 1, wherein the height of the first nonconductive supporting element is greater than the height of the second nonconductive supporting element.

5. The mobile device as claimed in claim 1, wherein the antenna structure further comprises:

a shorting element, wherein the second radiation element is coupled through the shorting element to the feeding connection element, such that a closed loop is formed by the feeding connection element, the second radiation element, and the shorting element.

6. The mobile device as claimed in claim 5, wherein the feeding connection element, the second radiation element, and the shorting element are distributed over only the second nonconductive supporting element.

7. The mobile device as claimed in claim 5, wherein the antenna structure covers a low-frequency band from 2400 MHz to 2500 MHz, a first high-frequency band from 5150 MHz to 5350 MHz, and a second high-frequency band from 5350 MHz to 5850 MHz.

8. The mobile device as claimed in claim 7, wherein a total length of the feeding connection element and the first radiation element is substantially equal to 0.25 wavelength of the low-frequency band.

9. The mobile device as claimed in claim 7, wherein a total length of the feeding connection element and the second radiation element is substantially equal to 0.25 wavelength of the second high-frequency band.

10. The mobile device as claimed in claim 7, wherein a total length of the feeding connection element, the second radiation element, and the shorting element is substantially equal to one wavelength of the second high-frequency band.

11. The mobile device as claimed in claim 1, wherein the first radiation element is distributed over the first nonconductive supporting element and the second nonconductive supporting element.

12. The mobile device as claimed in claim 1, further comprising:

a display device; and a display frame, disposed adjacent to the display device, wherein the display frame extends into a height-difference notch defined by the first nonconductive supporting element and the second nonconductive supporting element.

13. The mobile device as claimed in claim 12, further comprising:

a coaxial cable, disposed between the display device and the second nonconductive supporting element.

14. The mobile device as claimed in claim 13, wherein the coaxial cable comprises a central conductive line and a conductive housing, and the central conductive line is coupled to the feeding point.

15. The mobile device as claimed in claim 14, further comprising:

a metal back cover, disposed adjacent to the first nonconductive supporting element, the second nonconductive supporting element, the antenna structure, and the display device; and a metal foil, wherein the conductive housing of the coaxial cable is coupled through the metal foil to the metal back cover.

16. The mobile device as claimed in claim 15, wherein a separable antenna element is formed by the first nonconductive supporting element, the second nonconductive supporting element, and the antenna structure.

17. The mobile device as claimed in claim 16, wherein a concave region is defined by the display device, the display frame, and the metal back cover, and wherein the separable antenna element is hidden in the concave region, or is extracted from the concave region.

* * * * *